UNITED STATES PATENT OFFICE.

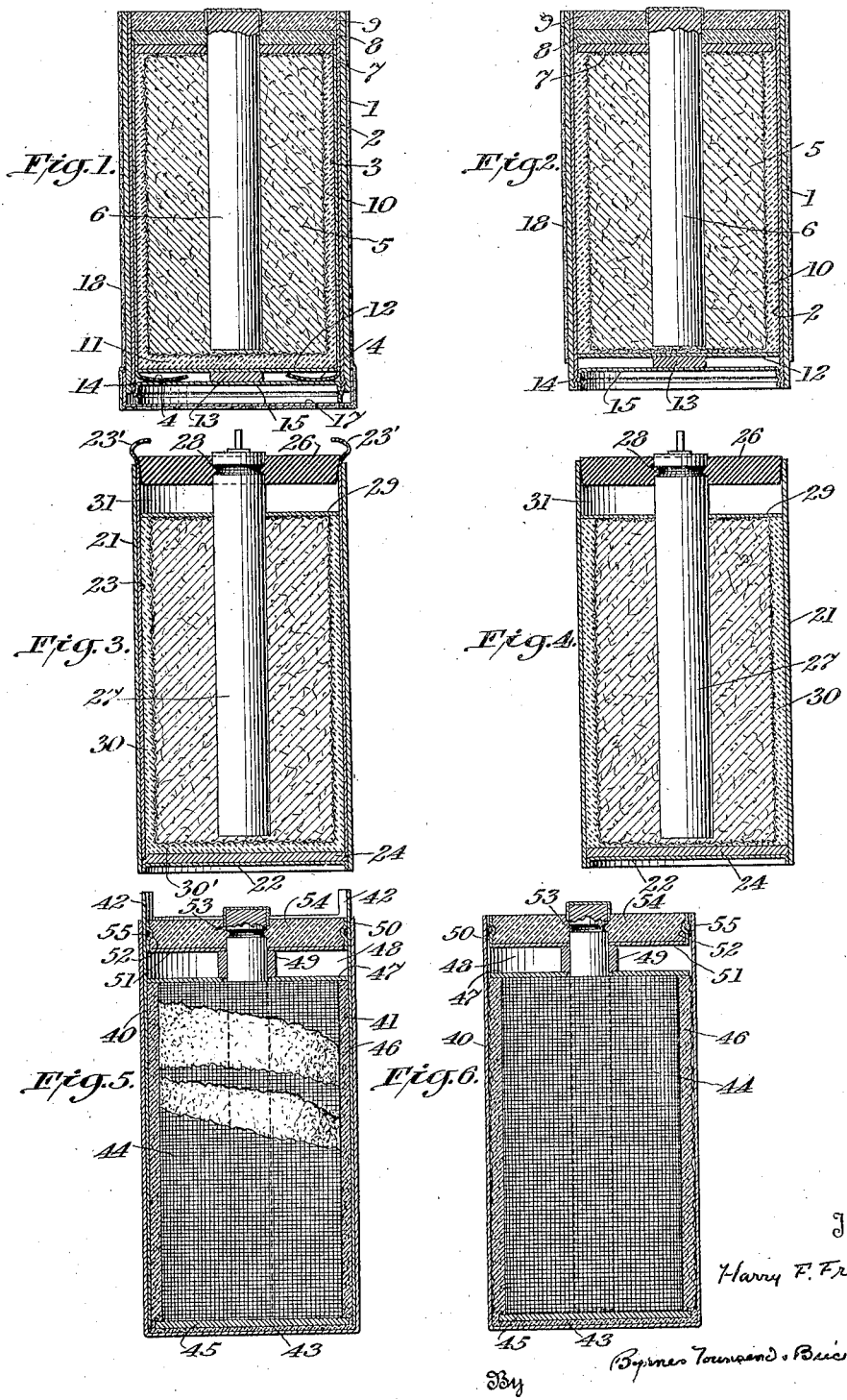

HARRY F. FRENCH, OF FREMONT, OHIO, ASSIGNOR TO NATIONAL CARBON COMPANY, INC., A CORPORATION OF NEW YORK.

DRY CELL.

1,402,224.    Specification of Letters Patent.    Patented Jan. 3, 1922.

Application filed March 4, 1920. Serial No. 363,183.

*To all whom it may concern:*

Be it known that I, HARRY F. FRENCH, a citizen of United States, residing at Fremont, in the county of Sandusky and State of Ohio, have invented certain new and useful Improvements in Dry Cells, of which the following is a specification.

This invention relates to an improvement in dry cells, and more particularly to a construction in which shelf life deterioration is eliminated. Cells of this type are known as deferred action cells, and in general some manipulation is required to render them active.

My invention relates to a cell of the latter kind and has for its principal objects to cheapen and simplify the construction and to utilize a simple manipulation and to secure a compact single-package cell containing all of the necessary component parts of the cell in substantially the relationship required for service.

In the particular forms chosen for illustration, I utilize a construction which quite closely resembles an ordinary dry cell and can therefore be manufactured by well known and established methods.

The invention resides primarily in the utilization of a membrane, such as a sheet or liner of insulating material in an assembled cell containing the materials necessary for producing current, said membrane being located between the cathode and anode in a manner which will protect the latter from corrosion, and adapted to be manually or mechanically withdrawn. More specifically, the invention resides in the use of a removable formed sheet or tube of insulating material adapted to withstand the electrolyte, as a protecting medium or liner for a sheet zinc electrode of round, square or other suitable form, in conjunction with a cathode located within the liner, said cathode preferably comprising a carbon electrode, a mix moistened with electrolyte molded around the electrode, and having a supply of gelatinous paste intermediate the mixer and liner.

In the claims the term "membrane of insulating material adapted to be manually withdrawn" will be adopted to cover flat sheets, liners formed from flat sheets, seamless tubes and like protecting mediums within the invention.

Other specific features of the invention will be set forth in connection with the following description of several forms which resemble an ordinary dry cell.

Referring to the drawings:—

Fig. 1 is a central vertical section of a cell in the inactive condition.

Fig. 2 is a section of the cell after it has been made ready for action.

Figs. 3 and 4 are similar views illustrating a modification in the inactive and active conditions respectively.

Figs. 5 and 6 are similar views illustrating a further modification in the inactive and active conditions respectively.

Referring to Figs. 1 and 2, an ordinary cardboard tube 1 such as is used for the jacket of dry cells serves as a receptacle for a tubular zinc electrode 2. To protect the surface of the zinc which will later be acted upon to produce electric current, I provide the zinc with a removable liner of insulating material 3 which is unaffected by the electrolyte, and extends to within a short distance of the top of the zinc. Various materials may be used for the liner, such as a sheet of celluloid or material having similar characteristics, which is relatively strong, thin and unaffected by the electrolyte. For grasping the liner to later permit its removal in the construction of Figs. 1 and 2, I have shown by way of example, a pair of diametrically opposite celluloid ears 4 at the lower end, integral with the liner.

The invention preferably utilizes a "bobbin" type cathode in which the mix 5 of manganese dioxide, carbon and electrolyte solution is molded around a carbon electrode 6. The upper end of the cell is closed by an insulating disk 7 in the upper end of the liner, a soft subseal 8 of pitch, heavy asphalt or similar material over the disk 7 covering the upper edge of the liner and the usual hard pitch or red sealing compound 9 over the soft subseal.

Although the end of the liner is embedded in the seal to prevent passage of electrolyte to the zinc, by utilizing a soft subseal the liner may be readily withdrawn.

The space between the bobbin and liner is filled with a paste 10 containing for example, flour or starch and electrolyte solution and preservative. It is also advantageous in some instances to provide a layer 11 of paste at the bottom of the mix for a purpose to be referred to subsequently.

The paste is retained in position by a rather tight fitting insulation disk 12 and the strips 4 are folded over the disk. The disk 12 may also have a central insulating disk 13 in the center thereof in alignment with the carbon for a purpose which will be discussed later. The lower end of the zinc electrode is preferably grooved at 14 or otherwise formed to receive a press fit metal bottom 15 which in the inactive condition is located in the lower end of the jacket in the position shown. The jacket is closed by means of a removable cap 17, and to prevent evaporation the jacket and cap may be coated with waterproofing material such as paraffine 18.

When it is desired to use the cell, the user first removes the cap 17 and the bottom 15, and then withdraws the liner by grasping the ears 4. During this operation it will be necessary to prevent the disk 12 from being withdrawn, as this disk serves as a scraper to remove the paste from the inside of the liner and retain it in substantially its original position. This may be done for example by resting the cell on the top of a small column and drawing the liner downward, or in any other suitable manner. The application of pressure to the paste scraper will tend to force some of the paste 11 between the bottom of the mix and the paste scraper into the space between the bobbin and zinc to fill the space occupied by the liner. The bottom 15 will then be secured in the cell, the proportions preferably being such that the bottom 15 touches the disk 13 and an air space is left in the lower end of the cell around the disk. If the paste is relatively soft and the liner is thin, paste will contact with the zinc over enough of the surface to start the action without providing a supply of paste to fill the space vacated by the liner. The expansion of the paste during service will subsequently tend to fill the space when current is drawn from the cell.

When the cells are to be used in series in a flash-light with the upper end of the carbon electrode in contact with the bottom of the zinc electrode of the adjacent cell, the metal bottom 15 is desirable, but if the cells are not to be utilized in this manner a closure of insulating material such as a cork may be used.

In the modification shown in Figs. 3 and 4 an ordinary zinc dry cell can 21 having a zinc bottom 22 is utilized in combination with a liner 23 having its lower end extending in a soft seal 24 of pitch. The bobbin 25 is supported by means of a stopper 26 fitted in the liner, the stopper being made of rubber for example, which is adapted to fit the carbon electrode 27 tightly to support the bobbin. The electrode is shown as grooved at 28 and in interlocked relation with the stopper for this purpose. An insulating disk 29 which serves as a paste scraper is fitted over the electrode on top of the mix, and the space between the mix and liner and below the mix is filled with paste 30.

When the cell is to be placed in action the closure 26 is removed from the liner and preferably also from engagement with the carbon electrode, and the liner is then withdrawn through the upper end by grasping the projecting ends 23' of the liner, and holding the paste scraper 29 down by any suitable means. In this manner the separating sheet is removed, leaving the paste in the cell in an advantageous position around the depolarizing bobbin containing the necessary moisture and other constituents. The closure 26 is then fitted around the carbon electrode and in the zinc can. As the zinc can is of slightly larger diameter than the liner, the closure and the bobbin connected thereto will extend a little further into the can than in the inactive condition. This is desirable, as by pushing the closure and attached bobbin further into the can an arrangement is provided for forcing paste 30' from the space below the bobbin to fill that vacated by the liner.

In the finished condition an air chamber 31 is formed between the closure and the insulating disk for receiving gases which are generated, and paste exuded on heavy service. The provision of such an air chamber substantially decreases leakage on service.

In Figs. 5 and 6 a modification is shown in which certain structural details are changed in order to eliminate the insertable closure and the manipulation of the paste scraper. An ordinary zinc container electrode 40 is provided with a liner 41 having ears 42 projecting above the top of the can. A layer 43 of material preferably similar to the subseal previously described, is poured in the bottom of the can to seal the end of the liner therein. The depolarizing mix bobbin 44 which preferably has an insulating spacing disk 45 attached to the lower end, is then fitted in the lined zinc container. By pressing the disk into the layer 43 the bottom may be secured to the can for a purpose to be mentioned later. The space between the mix and liner is filled with paste 46, a paste scraper 47 being fitted thereover. An air space 48 may be provided by an insulating washer 49 fitted around the electrode, a ferrule 50 fitted in the upper end of the zinc container and a disk 51 in the ferrule resting on the washer. The ferrule and carbon electrode are preferably grooved as shown at 52 and 53 and the intermediate space is filled with the usual sealing compound 54. The groove in the ferrule may be filled with heavy grease 55 to prevent evaporation.

The cell is activated by withdrawing the liner. It will be unnecessary to manipulate any other parts as the bobbin is secured to the zinc container by the insulating layer in the bottom and the paste scraper is held in position by the elements in the upper end of the cell. With this construction, contact between the zinc and paste over portions of the surface is relied upon to establish conductive relation between the mix and zinc. Subsequent swelling during service will provide more uniform contact.

I am aware that it has been suggested to coat the inside of a zinc can with paraffine to prevent shelf corrosion, but the present invention does not require the application of heat to render the cell active and is more certain in its action. I am also aware that it is old to wrap a bobbin in waterproof paper which is subsequently removed, but find this troublesome because the relationship of the parts must be altered to put the cell in action.

Having described my invention, what I claim is:—

1. A dry cell of the kind described, comprising an anode and a cathode arranged in substantially the relationship required for service, and a membrane of insulating material between said anode and cathode, adapted to be manually removed to render the cell active without materially disturbing the relationship of the electrodes.

2. A dry cell of the kind described, comprising an anode and a cathode arranged in substantially the relationship required for service, and a thin membrane of celluloid-like material between said anode and cathode adapted to be manually withdrawn to render the cell active without materially disturbing the relationship of the electrodes.

3. A dry cell of the kind described, comprising a hollow anode, a cathode in proximity thereto, said anode and cathode being arranged in substantially the relationship required for service, and a liner of insulating material coiled within said anode surrounding the cathode and adapted to be manually withdrawn from the anode.

4. A dry cell of the kind described, comprising a hollow zinc electrode, a depolarizing mix bobbin in proximity thereto, a liner of insulating material within said zinc electrode surrounding the bobbin, and a filling of paste between the zinc electrode and the bobbin, said liner being adapted to be manually withdrawn.

5. A dry cell of the kind described, comprising a hollow zinc electrode having an open end, a depolarizing mix bobbin spaced therefrom, a liner of insulating material coiled within said zinc electrode and a filling of paste between the liner and the mix bobbin, said sheet being adapted to be manually withdrawn through the open end of the zinc electrode.

6. A dry cell of the kind described, comprising an anode, an insertable closure for one end of the cell, a cathode, a filling of paste between the anode and cathode, and a sheet of insulating material between the paste and zinc electrode adapted to be manually withdrawn upon removing the closure.

7. A dry cell of the kind described, comprising a hollow zinc electrode, a molded depolarizing mix bobbin therein spaced therefrom, a closure for one end of the cell adapted to support the bobbin, a liner of insulating material adjacent the zinc electrode, a filling of paste between the depolarizing mix and the liner, a closure for the other end of the cell, one of said closures being adapted to be removed to permit the manual withdrawal of said liner to render the cell active.

8. A dry cell of the kind described, comprising a tubular zinc electrode, a depolarizing mix bobbin therein spaced therefrom, a closure for the upper end of the cell adapted to support the mix bobbin in the zinc electrode, a liner of insulating material coiled within the zinc electrode, a filling of paste between the mix and insulating sheet, and a metal bottom for the lower end of the zinc electrode, said liner being adapted to be manually withdrawn through one end of the tubular zinc electrode.

9. A dry cell of the kind described, comprising a hollow zinc electrode, a depolarizing mix bobbin therein, a closure for one end of the zinc electrode adapted to support the mix bobbin in spaced relationship from the zinc tube, a liner of insulating material coiled within the zinc electrode, a filling of paste between the mix and liner, and an additional supply of paste at one end of the mix, said insulating sheet being adapted to be manually withdrawn from the zinc electrode, to render the cell active, said additional supply of paste being dapted to be forced into the space vacated by the insulating liner.

10. A dry cell of the kind described, comprising an anode and a cathode, a sheet of insulating material between the anode and cathode, a filling of paste between the anode and cathode, and an insulating disk in the cell, said liner being adapted to be withdrawn through one end of the zinc electrode, and said insulating disk being adapted to retain the paste in position when the liner is withdrawn.

11. A dry cell of the kind described, comprising a zinc electrode, a filling of soft sealing material at one end of the cell, a depolarizing mix spaced from the zinc, a sheet of insulating material between the mix and zinc electrode and having one edge embedded in the soft sealing material, and a filling of paste between the insulating sheet and the mix, said sheet being adapted to be withdrawn through the other end of the cell to render the cell active.

12. A dry cell of the kind described, comprising a hollow zinc electrode having a metal bottom, a molded depolarizing mix bobbin therein spaced therefrom, a liner of insulating material coiled within the zinc electrode, a filling of paste between the mix and insulating sheet, a supply of paste between the bottom of the zinc electrode and the lower end of the mix, a removable closure for the upper end of the cell adapted to be fitted in the liner when the cell is in the inactive condition, and adapted to be inserted in the zinc electrode when the liner is withdrawn to render the cell active, whereby the bobbin displaces the additional supply of paste at the lower end to fill the space vacated by the removal of the insulating sheet.

13. A dry cell of the kind described, comprising a hollow zinc electrode, a depolarizing mix bobbin in the can spaced therefrom, a liner of insulating material between the zinc electrode and mix bobbin, a filling of paste between the liner and the mix, a seal in the upper end of the zinc, and an insertable closure for the lower end of the cell adapted to permit the liner to be withdrawn from the lower end to render the cell active.

14. A dry cell of the kind described, comprising a zinc container electrode, a liner of insulating material in the zinc, a layer of sealing compound in the bottom of the container, a depolarizing mix bobbin in the container spaced therefrom and having its lower end in contact with the sealing layer, a carbon electrode projecting from the upper end of the mix, a filling of gelatinous paste between the mix bobbin and liner, a ferrule in the upper end of the liner and container, said ferrule having a groove filled with soft sealing material, and a filling of sealing compound between the ferrule and carbon electrode, said liner being adapted to be withdrawn without moving the bobbin and closure.

In testimony whereof, I affix my signature.

HARRY F. FRENCH.